May 27, 1941. H. KEPPER Re. 21,811
THICKENING, STIRRING, OR AGITATING APPARATUS
Original Filed July 16, 1936 4 Sheets-Sheet 1
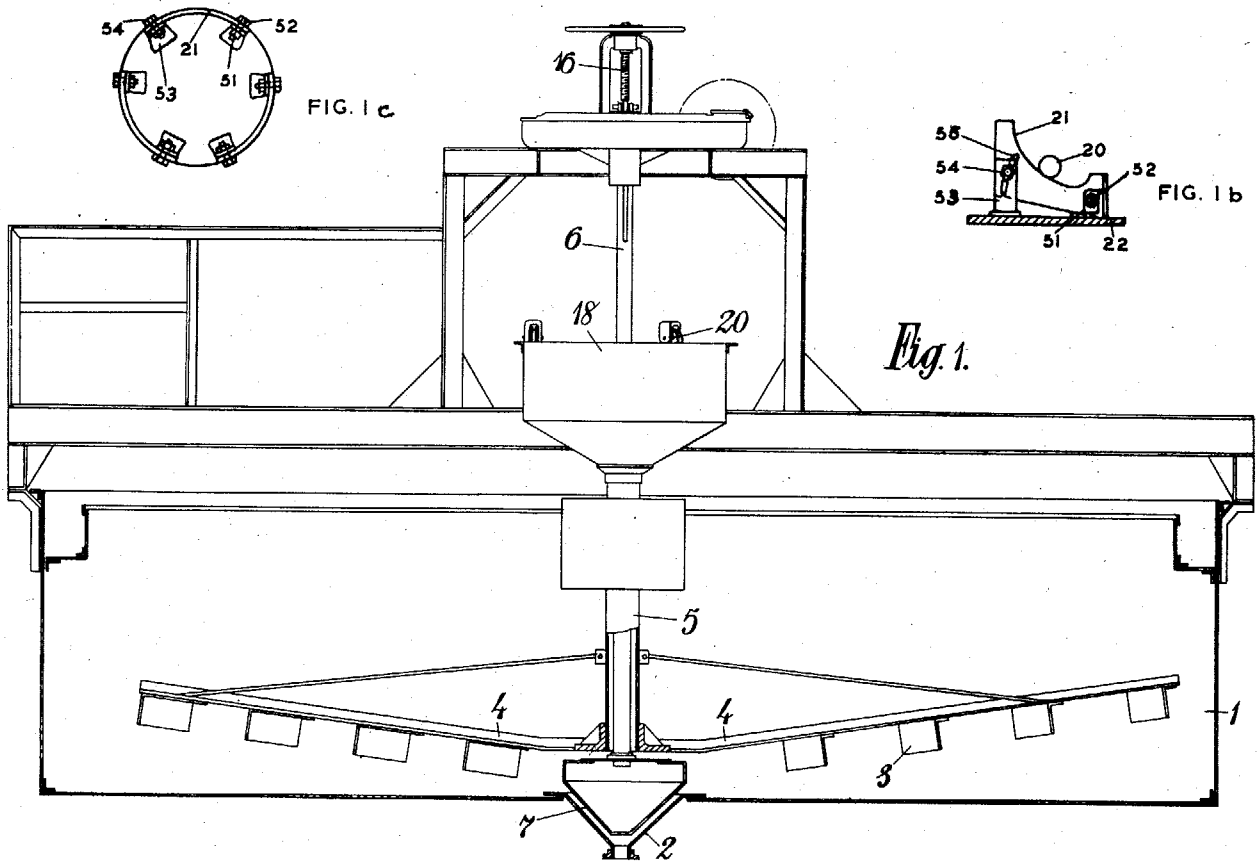
INVENTOR:
HENRY KEPPER
BY: Arthur Nicholson
Att'y.

May 27, 1941. H. KEPPER Re. 21,811

THICKENING, STIRRING, OR AGITATING APPARATUS

Original Filed July 16, 1936 4 Sheets-Sheet 2

INVENTOR:
HENRY KEPPER
By. Arthur Nicholson
Att'y.

THICKENING, STIRRING, OR AGITATING APPARATUS
Original Filed July 16, 1936 4 Sheets-Sheet 3
Fig. 6.
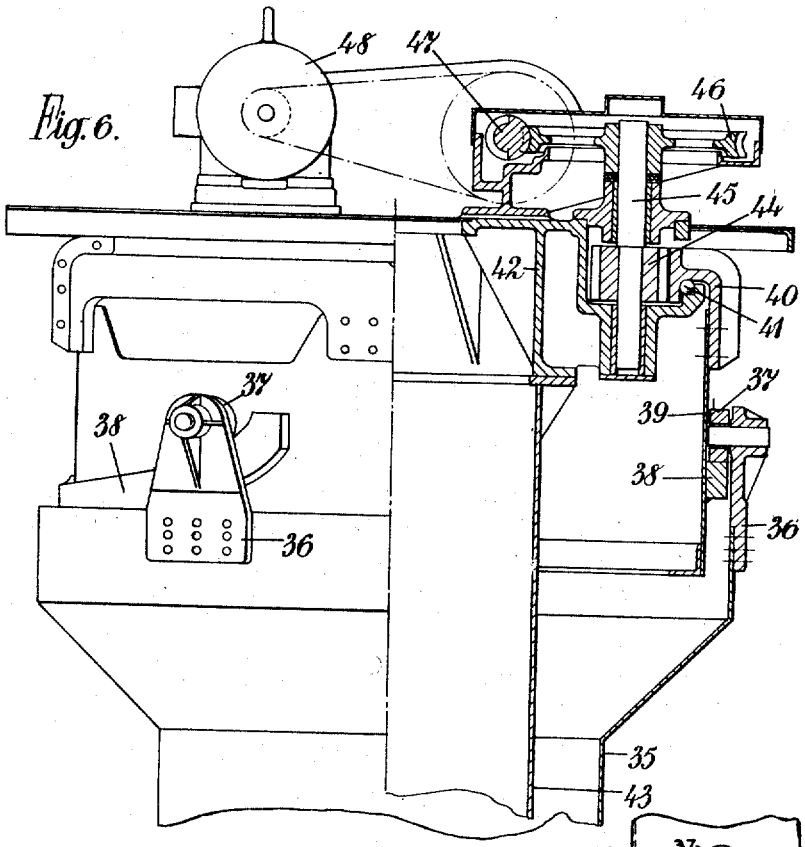
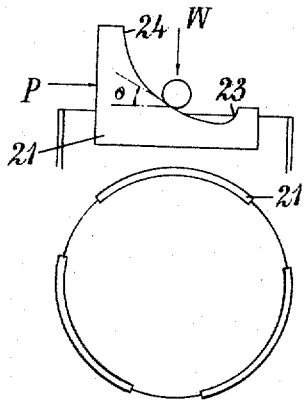
Fig. 2.
Fig. 3.
$P = W \tan \theta$
FIG. 6 a
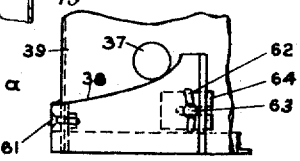
FIG. 6 b
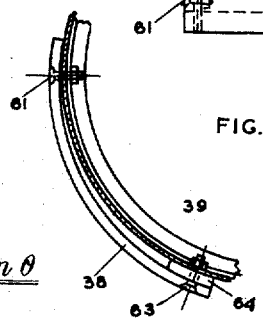
INVENTOR:
HENRY KEPPER
By: Anton Nissolson
Att'y.

May 27, 1941. H. KEPPER Re. 21,811
THICKENING, STIRRING, OR AGITATING APPARATUS
Original Filed July 16, 1936 4 Sheets-Sheet 4
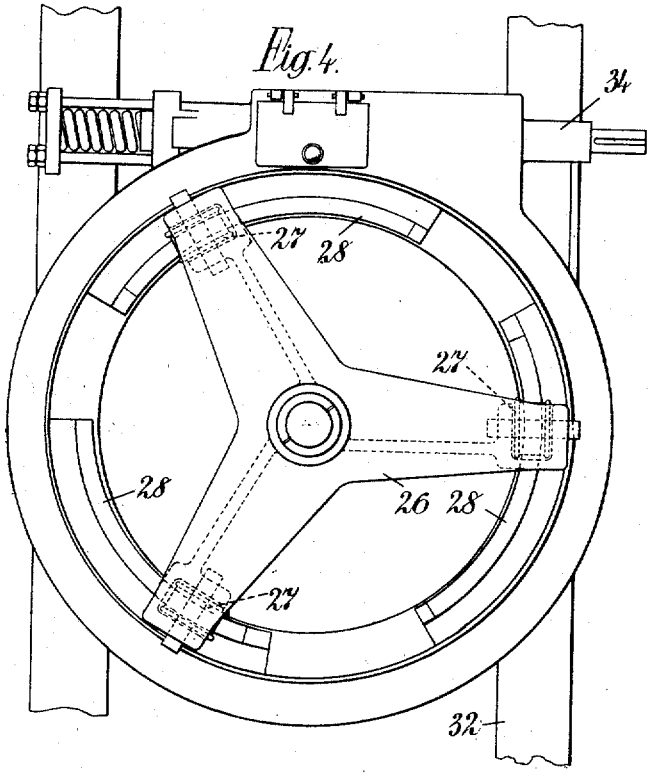
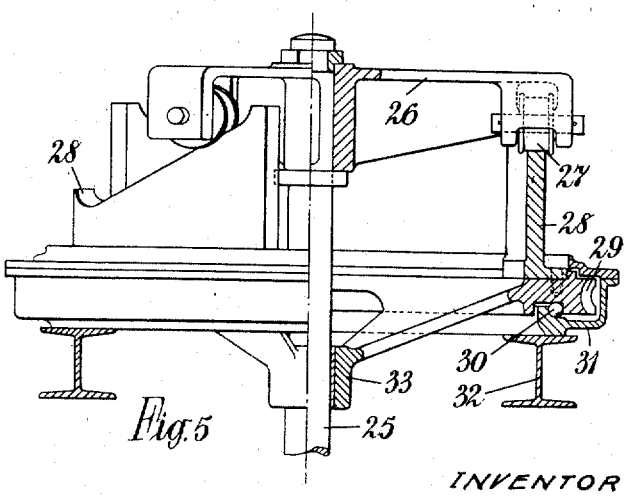
Fig. 5
INVENTOR:
HENRY KEPPER
By: Anton Nidolson
Att'y.

Reissued May 27, 1941

Re. 21,811

UNITED STATES PATENT OFFICE 21,811

THICKENING, STIRRING, OR AGITATING APPARATUS

Henry Kepper, Voorburg, Netherlands, assignor to The Dorr Company, Inc., New York, N. Y., a corporation of Delaware Original No. 2,122,287, dated June 28, 1938, Serial No. 90,965, July 16, 1936. Renewed March 12, 1938. Application for reissue July 7, 1939, Serial No. 283,322. In Great Britain July 16, 1935

14 Claims. (Cl. 259—8)

This invention relates to thickening, stirring or agitating and like apparatus for treating settled solids, sludges, pulps or other liquids or mixtures and may be employed with particular advantage in thickening or sedimentation apparatus employing rotating or revolving rakes or stirring and like devices adapted to thicken the material by their passage therethrough while concurrently effecting progressive displacement of the settled material preferably towards a discharge outlet or outlets.

One of the objects of the invention is to provide improved and simplified means for dealing with overloads in apparatus of the character described when the resistance to movement of the rakes or stirrers increases.

Another object is to provide improved means adapted when the resistance opposed to movement of the rakes increases, to raise the rakes while at the same time increasing the driving torque applied to the rakes.

Another object is to provide an apparatus of the character described adapted to deliver sludge or other thickened material in which the ratio of liquid to solids is approximately constant.

A further object is to provide a mechanism for the purpose indicated which allows the driving torque for every vertical position of the rake mechanism to be predetermined and further to enable adjustment of the variation in torque to be made for different changes in vertical position.

The invention consists in driving mechanism for apparatus of the character described in which relative angular displacement between driving and driven members causes separating thrust through contacting surfaces adapted to raise the rake or similar device while transmitting a constantly increasing torque to such device.

According to the invention the drive is transmitted to the rotating rake or stirring devices through relatively movable members one of which is of cam form having a progressively increasing slope so that relative movement between such members causes the rakes or the like to be raised or lowered and concurrently therewith effects or permits a progressive increase or decrease in the driving torque applied to the rakes.

According to a feature of the invention the rake or stirrer devices are suspended as by rollers or other sliding engagement means such as slide blocks with one or more inclined guides by the motion of which rotation is imparted to the rakes, the position of the sliding engagement means on the guide or guides being determined by the weight of the suspended mechanism and the resistance to motion of the rakes. As the inclination of the guide surface is a progressively increasing one it will be seen that as the resistance to motion increases the rake mechanism is raised upon the guide or cam surfaces to a position where the slope thereof is steeper and consequently the guide is capable of imparting a greater driving torque to the rakes or stirrers with the result that the capacity of the mechanism to clear the overload is increased.

The rate of increase in the slope of the inclined guides may be constant or it may be varied for different parts of the slope. Thus the lower part of the slope may be steeper, giving a greater increase in the driving torque for the initial part of the lift than for the latter part. Alternatively, the upper part of the slope may be made steeper than the lower part so that near the end of the permissible lift the ability to impart increased driving torque increases at a greater rate. An automatic device may be provided to cut out the driving motor when the rakes have been raised to the full height permitted.

In a preferred arrangement three (or more) guides are provided comprising arcuate elements mounted on a driving member or drum and having their upper surfaces of the desired progressively increasing slope upon which run rollers mounted on a member from which the rake mechanism is suspended. The guide elements may be adjustably mounted to permit variation of their slope to suit different conditions of working. Where such adjustment is provided the engaging rollers must be of extra width to allow for transverse displacement of the arcuate guide surfaces when adjusted.

According to a further feature of the invention means are provided for applying additional load to the rakes and adjustably varying the load thereon. This may be done for example by loading the suspended part of the mechanism in any convenient way as by removable weights. Means may also be provided for raising the rakes independently of the automatic arrangement.

According to a further feature, rotatable rake devices and a rotatable scraper device for the discharge are independently mounted so that the rakes may be raised in accordance with the load without affecting the position of the discharge scraper. This may be done by mounting the curved guide elements upon a vertical shaft carrying the discharge scraper, the rotatable rakes being carried by a hollow shaft or sleeve suspended from the guides. Hand operated means may be provided for lifting the discharge scraper shaft and with it the rotatable rakes.

Other features of the invention will be described hereinafter or pointed out in the appended claims.

Referring to the accompanying drawings—

Figure 1 is an elevation in diagrammatic form and partly in section of a thickening apparatus for sewage or other sludges or pulps constructed in accordance with the invention;

Figure 1*a* is a sectional elevation of the central portion of the apparatus of Figure 1 showing the supporting and driving mechanism for the rakes in detail;

Figures 1*b* and 1*c* are respectively vertical and a plan view illustrative of a manner by which a guiding element or cam-shaped member of Figs. 1 and 2 can be supported whereby the slope of the guiding or cam-shaped surface thereof can be adjusted.

Figure 2 is a diagram showing the principle of the lifting mechanism; and

Figure 3 is a diagrammatic plan view showing the arrangement of the arcuate guides;

Figure 4 is a plan view;

Figure 5 is an elevation partly in section of a modified form of the supporting and driving mechanism for the rakes of a thickener;

Figure 6 is an elevation partly in section of another modified form of the supporting and driving mechanism for the rakes of a thickener.

Figure 1A:
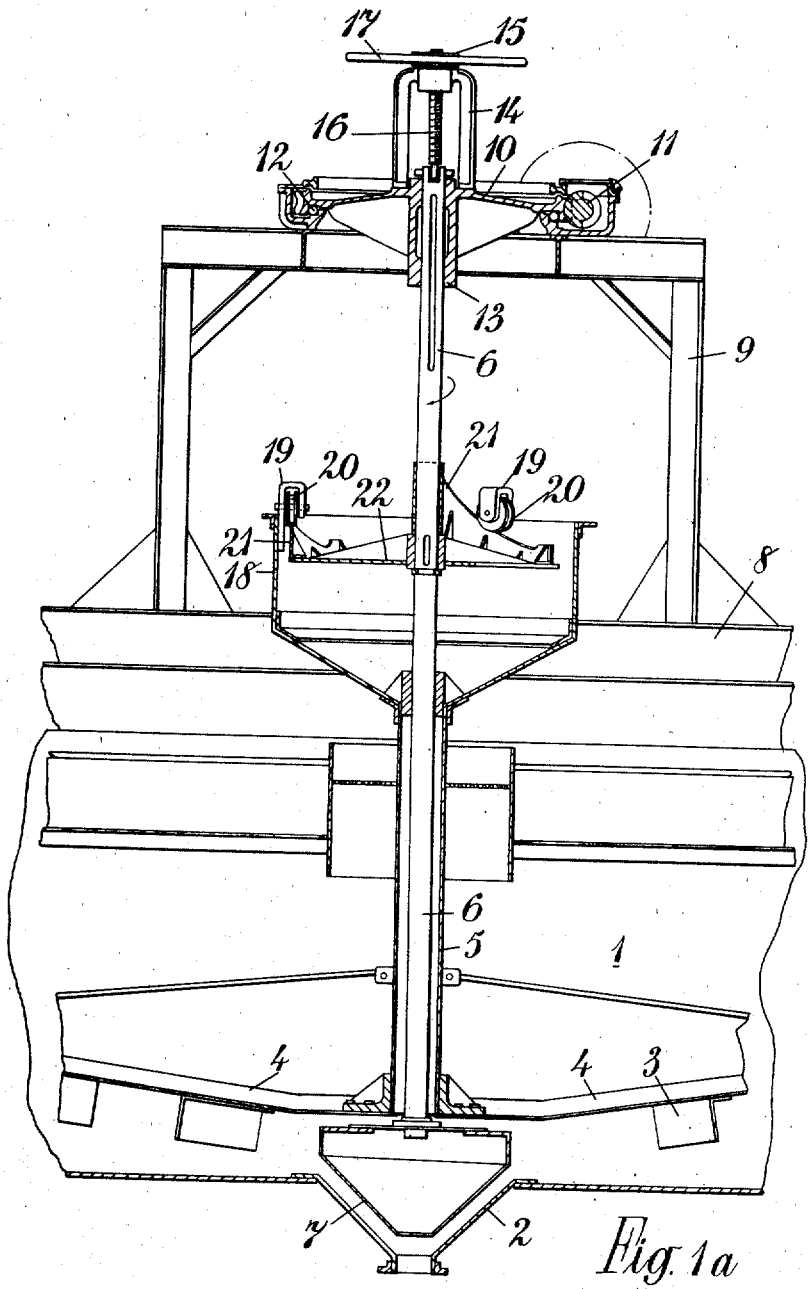

Figures 6*a* and 6*b* are respectively vertical and plan views illustrative of a manner by which a guiding element or cam-shaped member thereof can be supported whereby the slope of the guiding or cam-shaped surfaces thereof can be adjusted.

In carrying the invention into effect according to one convenient mode as applied by way of example to a thickener for sewage or other sludges or pulps, a settling tank 1 as shown in Figure 1 is provided with the usual arrangements for introducing the liquid to be treated and for drawing off supernatant clarified effluent, and the settled solid matter is withdrawn from a central discharge outlet cone 2. A series of rakes or scrapers 3 of the usual inclined form are mounted upon rotatable arms 4 carried by a rotatable sleeve element or driven hollow torque transmitting shaft element 5 which is adapted for vertical movement as described hereinafter. A shaft or central shaft element 6 is arranged within the sleeve 5 and carries at its lower end a scraper element 7 the purpose of which is to prevent clogging of material in the discharge cone or outlet 2.

The tank is provided with a transverse beam structure 8 upon which is mounted a superstructure 9 carrying the rotatable rake mechanism.

A gear wheel 10 driven from a suitable motor through a worm 11 is rotatably carried on ball bearings 12 and has a hub 13 through which the shaft 6 extends, there being a keying or splined connection between the shaft and hub which permits vertical displacement of the shaft and transmission of rotational motion thereto. The gear wheel 10 carries a support 14 which affords a bearing for a nut element 15 engaging with a threaded extension 16 of the shaft 6. A handwheel 17 enables the nut element to be rotated to raise and lower the shaft.

The hollow sleeve 5 which carries the rakes is attached to a drum 18 upon the upper edge of which are secured three brackets 19 each carrying a grooved roller 20. These rollers run upon inclined guide elements 21 carried by a supporting element 22 fixedly secured to the shaft 6. The guide elements 21 which are arcuate in plan have their upper edges formed as spiral surfaces of progressively increasing slope as shown in Figure 2. The lowest portion of the guide surface terminates in an upwardly curved part 23 which serves as a stop to prevent the rollers leaving the guide, and thence the upward slope progressively increases to the point 24.

It will be appreciated from the construction described that the sleeve 5 and the rakes attached thereto are suspended upon the guide elements 21 and when the rakes are in their lowermost position the rollers 20 will lie against the stop portions 23. Upon applying the drive to the shaft 6 through the gear wheel 10 and key connection 13 the guide elements 21 will be moved against the rollers 20 which will tend to lag behind and ride up the guides to a position determined by the relation between the resistance opposed to the rotation of the rakes and the weight of the mechanism suspended from the rollers, i. e. the weight of the rakes, hollow shaft 5 and the drum 18 with its attachments. This relation is proportional to the slope of the guides and as this progressively increases so the driving torque which can be applied to the rakes will increase with the lift of the rakes, or in other words as the load on the rakes increases and they are lifted proportionately higher, the work done on the solid material by the rakes is increased so that the tank can be cleared of the accumulation causing the overload. An important feature of the arrangement is that the driving torque increases constantly throughout the rise of the rakes.

It will be seen that the construction described provides for the rise and fall of the rakes during the thickening process but that the centre scraper 7 is unaffected thereby and always remains in the best position for keeping the discharge outlet 2 clear and preventing the latter from becoming choked with solids.

If it is desired to lift the rakes for any reason this may be done by rotating the handwheel 17 which in turn rotates the nut element mounted thereon. This raises the shaft 6 and a collar mounted on the lower end thereof engages the sleeve 5 and thus the whole of the rake mechanism may be lifted. At the same time the scraper 7 is withdrawn from the discharge cone.

By giving a suitable form to the upper or cam surfaces of the guide elements 21, any desired operating characteristic may be obtained, such as is suited to the kind of material being dealt with and the work the thickener is required to perform. Moreover if desired provision may readily be made for adjustably varying the slope of the guide surfaces. This may be carried out in various ways but conveniently the arcuate guide elements are pivoted at one end and secured at the other by means such as a bolt engaging in a slot or in a series of bolt holes to give the desired range of adjustment. Since the guide elements are of arcuate form their cam surfaces will move laterally when adjusted and consequently the rollers must be made wider than the guide to engage therewith in all positions of the latter. If desired the rollers may be flanged on one side only and have broad treads like locomotive wheels.

A mode by which the guiding elements 21 are carried so as to be adjustable with respect to the supporting element or carrying plate 22 is illustrated by Figs. 1b and 1c. According to these figures, a bracket 51 is suitably secured—as by welding—to the supporting element or plate 22 and a bolt and nut 52 provide a pivotal means by which the low end of the guiding element is carried and secured in place. A second bracket 53 is secured to the plate 22; it has a hole for receiving a bolt 54 that also passes through a slot 55 provided in the deep end portion of the guiding element 21. A nut on the bolt 54 is relied upon to secure the guiding plate in any adjusted position within the range permitted by the slot 55 thereof.

As previously explained the torque which can be applied to the rakes depends upon the weight of the parts suspended from the guides and this affords a simple way of adjusting the torque by loading or unloading the suspended structure. Thus for example suitable weights may be supported in any convenient manner upon the drum 18 and by increasing or reducing the number and/or size of the weights the torque may be adjusted within the range available.

Another mode of carrying the invention into effect is illustrated in Figures 4 and 5 which show the driving and supporting mechanism for the rakes adapted to be applied to various constructions of thickener or clarifier or similar apparatus. In this example no provision is made for lifting the rakes by hand or for raising the rakes independently of a centre scraper if such is employed.

The rakes are mounted upon a vertical shaft 25 which may or may not be provided with a steady bearing. The shaft is suspended from a spider frame 26 carrying three grooved rollers 27 which rest on guides 28 of similar form to the guides 21 described in conjunction with the previous example. These guides are carried by and secured to a large gear wheel 29 rotatably carried by ball bearings 30 mounted in a casing 31 which is supported on transverse beams 32. The gear wheel 29 has a central hub 33 formed as a journal bearing for shaft 25 so that the latter is capable of both vertical and rotational movement with respect to the gear wheel. A motor conveniently mounted on any suitable part of the supporting structure drives the shaft 34 which carries a worm meshing with the gear wheel 29. The operation of the device is similar to that of the previous example and further description is accordingly unnecessary.

Another mode of carrying the invention into effect is illustrated in Figure 6 as applied to a thickener or similar apparatus of the pedestal type in which the rake or stirrer mechanism is carried by a drum or equivalent member rotatably suspended from a pedestal upstanding from the bottom of the tank. The rake arms (not shown) are mounted in the usual way upon a drum 35 at the upper end of which are secured three brackets 36 equally spaced thereon. These brackets carry plain rollers 37 which extend inwardly and are adapted to ride upon spiral guide elements 38 which are secured to a second drum 39 of smaller diameter than the drum 35. Secured to the upper end of the drum 39 is an inwardly extending gear ring 40 which rests on ball bearings 41 carried by a supporting table 42 which is secured to the top of the central column or pedestal 43. The gear ring 40 is provided with internal teeth which mesh with a pinion 44 on a vertical shaft 45 carried in bearings on the table 42. A gear 46 on the shaft 45 meshes with a worm 47 which is driven from a motor 48 mounted on the table 42.

The mode of operation of the mechanism described above is similar to that previously described and it will be appreciated that the guide elements 38 may be made adjustable if desired. A means by which the guiding element 38 can be adjustably carried from and with respect to the supporting drum 39 is illustrated by Figs. 6a and 6b. According to these figures a bolt and nut 61 provides a pivotal means by which the low end of the spiral guiding element 38 is carried from the supporting drum 39. The high or deep end of the guiding element 38 is provided with an arc-shaped slot 62 that receives a bolt 63. The nut on the bolt 63 clamps the guiding element in proper adjustment with respect to the supporting drum 39. A washer or spacer piece 64 may be employed if the parts are so rigid that they will not flex but ordinarily a guiding element as 38 would be made of plate material that would yield under the tightening action of a bolt and nut and thereby permit the ready realizing and attaining of the desired adjusted position of the guiding element relative to the carrying or supplying drum 39. Moreover any suitable arrangements may be made for loading the suspended parts of the mechanism as by the addition of removable weights so that the torque applied to the rakes may be adjusted.

It is to be understood that the invention may be applied to all types of thickeners or clarifiers including thickeners having more than one compartment such as is described in British specification No. 262,479 and also to stirrers, agitators or sedimentation apparatus of all kinds employing rotating rakes, stirrers or sludge discharging devices. The invention may also be applied to hydro-separators, i. e., thickeners which are fed at a high rate so that separation of fine from coarse material is effected by overflowing the finer material and withdrawing the coarser particles from the bottom of the tank where they settle.

An important advantage which results from the practice of this invention is that due to the automatic control of the rakes the thickened material which is withdrawn has an approximately constant ratio of liquid to solid constituents.

In the operation of the arrangements described, when an undue resistance is opposed to the rakes due to any cause the rakes are lifted and at the same time a greater force can be applied to clear the obstruction. The result is that a choked or clogged tank may be cleared without the necessity of closing down the plant by the bringing into play of automatic devices for disconnecting the drive or switching out the motor. Thus by the use of the invention more uniform conditions of operation may be ensured and the possibility of shut-downs is greatly minimized, this with the aid of a mechanism which is simple in construction and not liable to get out of order.

Having now described my invention, what I claim as new and desire to secure by Letters Patent is:

1. In or for an apparatus of the character described, a rotatable and vertically movable rake or like element, and means for imparting rotation to said element, said means comprising a pair of relatively movable coacting members one of which is of cam form having a progressively increasing slope arranged so that relative movement between said members causes the rake or like element to be raised or lowered and concurrently therewith effects or permits a progressive increase or decrease in the driving torque applied to the rake element.

2. In an apparatus of the character described, a rotatable and vertically movable rake or like element, a rotatable element having an inclined surface of progressively increasing slope, means for driving said rotatable element, and sliding engagement means suspending said rake or like element from the said inclined surface whereby rotation of said surface imparts rotation to the rake or like element.

3. Driving mechanism for an element arranged to rotate about a vertical axis and adapted to operate upon material in a tank comprising a member having an inclined surface and movable about the said axis, means for adjusting the position of said member to vary the inclination of the surface thereof, and sliding or rolling engagement means coacting with said member and adapted to suspend and carry the said element.

4. An apparatus of the character described comprising a tank, an inlet and a discharge outlet therefor, a vertical shaft carrying scraper means for the discharge outlet, a sleeve encircling said shaft and rotatable independently thereof carrying rake means for operating upon material in the tank, a member having an inclined surface attached to and rotating with said shaft and means for suspending said sleeve from said inclined surface whereby rotation of the shaft will rotate the rake means and cause the latter to be lifted, independently of the discharge scraper, to a position depending upon the resistance offered to the rake means.

5. An apparatus for treating solid-bearing liquids or mixtures of liquids and solids, comprising a tank, inlet and outlet means therefor, an element rotatable about a vertical axis and adapted to operate upon material in the tank and means for imparting rotation to said element, said means comprising a pair of relatively movable coacting members one of which is of cam form having a progressively increasing slope arranged so that relative movement between said members during transmission of rotation causes the rotatable element to be raised or lowered in the tank and concurrently therewith effects or permits a progressive increase or decrease in the driving torque applied to the said element.

6. An apparatus for treating solid-bearing liquids or mixtures of liquids and solids comprising a tank, inlet and outlet means therefor, an element supported on the tank structure for rotation about a vertical axis, a plurality of arcuate guides carried on said element and having their upper surfaces of progressively increasing slope, means for driving said element, a vertical member carrying rake or scraper means operative within the tank and roller means secured to said vertical member adapted to run upon the inclined guide surfaces whereby upon rotation of said guides the rakes or scraper means will be rotated within the tank and concurrently lifted to a position determined by the resistance to rotation.

7. In an apparatus of the character described, in combination a driven rotary rake member rotatable about a vertical axis and mounted for axial movement, a driving rotary member coaxial with said driven member, a cam element fixedly associated with one of said members and having an inclined camming surface of progressively increasing slope, roller means associated with the other member and adapted and arranged for cooperatively engaging upon said camming surface, said rotary rake member being supported by reason of the cooperative engagement of said cam and said roller in a manner that relative movement between said members causes the rake element to be raised or lowered, depending upon the raking load encountered.

8. An apparatus of the character described comprising a tank, a driven rotary assembly having radial rake arms and a torque transmitting shaft element rising from and connected with the inner end portions of said rake arms and rotatable therewith, an annular drive gear element for said rake assembly and concentric with said torque transmitting shaft element, a cam portion associated with one of said concentric elements and providing a camming surface of upwardly increasing slope, cam roller means associated with the other concentric element and adapted and arranged for cooperatively engaging upon said camming surface, said torque transmitting element being supported by reason of the cooperative engagement of said cam element and said roller means in a manner that relative movement between said annular drive gear element and said torque transmitting shaft element will cause said rake arms to be raised or lowered, depending upon the raking load encountered; annular thrust bearing means for rotatably supporting said annular gear element, a support stationary with respect to said tank for said annular bearing means, and guide means for maintaining concentric and relatively rotative relationship directly between said torque transmitting shaft element and said annular gear element.

9. An apparatus according to claim 8 in which said cam element is associated and rotatable with said gear element.

10. An apparatus according to claim 8 in which the torque transmitting element is rotatably guided by way of said gear surrounding same.

11. An apparatus according to claim 8 in which the cam roller means comprise a plurality of cam rollers substantially equally spaced from the axis of rotation of the raking assembly and from one another, and in which said cam roller means are supported by a correspondingly equal number of cam portions.

12. An apparatus according to claim 8 in which the cam roller means comprise only three cam rollers substantially equally spaced from the axis of rotation of the raking assembly and from one another, said cam rollers being supported by a correspondingly equal number of cam portions.

13. An apparatus according to claim 8 in which the cam portion comprises a cylindrical crown element concentric and unitary with said gear element and extending upwardly therefrom.

14. An apparatus comprising a tank provided with a central slope outlet at the bottom, a rotary rake assembly having outwardly extending raking means and a driven hollow shaft element rising from and connected with the inner end portion of said raking means and rotatable therewith, a central shaft element served by and concentric with said hollow shaft element, and having connected with its lower end portion a center scraper operatively associated directly with said sludge outlet, a cam element associated with one of said shaft elements and having an inclined camming surface of an upwardly progressively increasing slope, roller means associated with the other shaft element and adapted and arranged for cooperatively engaging upon said camming surface, said hollow shaft being supported by reason of the cooperative engagement of said cam element and said roller means in a manner that relative movement between said hollow member and said central shaft element will cause said raking means to be raised or lowered, depending upon the raking load encountered, whereas the operating position of said center scraper remains unchanged, a means for driving said central shaft element.

HENRY KEPPER.